United States Patent
Yamauchi et al.

[19]

[11] Patent Number: 5,813,385
[45] Date of Patent: Sep. 29, 1998

[54] COMBUSTION CHAMBER STRUCTURE HAVING PISTON CAVITY

[75] Inventors: Toyosei Yamauchi, Tachikawa; Koji Morikawa, Higashikurume, both of Japan

[73] Assignee: Fuji Jukogyo Kabushiki Kaisha, Tokyo, Japan

[21] Appl. No.: 929,280

[22] Filed: Sep. 15, 1997

[30] Foreign Application Priority Data

Oct. 8, 1996 [JP] Japan .................................. 8-267526

[51] Int. Cl.⁶ .......................................................... F02F 3/26
[52] U.S. Cl. ........................ 123/276; 123/279; 123/295
[58] Field of Search .................................. 123/295, 279, 123/276

[56] References Cited

U.S. PATENT DOCUMENTS

| | | | |
|---|---|---|---|
| 2,762,348 | 9/1956 | Meurer | 123/279 |
| 3,999,532 | 12/1976 | Kornhauser | 123/279 |
| 4,446,830 | 5/1984 | Simko et al. | 123/276 |
| 5,329,902 | 7/1994 | Sakamoto et al. | 123/276 |
| 5,335,635 | 8/1994 | Kadoi et al. | 123/295 |
| 5,666,916 | 9/1997 | Fujieda et al. | 123/295 |
| 5,699,766 | 12/1997 | Saito | 123/276 |

FOREIGN PATENT DOCUMENTS

| | | | |
|---|---|---|---|
| 216387 | 10/1957 | Australia | 123/295 |
| 39225 | 10/1931 | France | 123/279 |

*Primary Examiner*—Erick R. Solis
*Attorney, Agent, or Firm*—Beveridge, DeGrandi, Weilacher & Young, L.L.P.

[57] ABSTRACT

An internal combustion engine having a cylinder head body with a pentroof-shaped combustion chamber comprises a piston including a piston cavity and a circular protrusion provided around the piston cavity, a fuel injector for injecting fuel downward to the piston cavity and a spark plug provided in proximity to an intake valve. Fuel is injected in a shape of a hollow cone and collides against the piston cavity and is diffused The diffused fuel is carried on the tumble flow of intake air and gathers around the electrode of the spark plug, this contributing to securing a stable stratified charge combustion. Further, the configuration of the circular protrusion prevents the sprayed fuel from scattering towards the cylinder wall.

9 Claims, 6 Drawing Sheets

COMBUSTION CHAMBER STRUCTURE HAVING PISTON CAVITY

BACKGROUND OF THE INVENTION

1. Field of the invention

The present invention relates to the structure of a combustion chamber for an in-cylinder direct fuel injection type spark ignition engine and particularly to the structure of a combustion chamber comprising a pentroof type cylinder head and a piston having a caldera-shaped piston cavity.

2. Prior Arts

So many approaches have ever been proposed to improve fuel economy of vehicles and among them an improvement of theoretical thermal efficiency, a reduction of pumping loss, a reduction of friction and the like have been proposed to raise fuel economy of an engine. To improve the theoretical thermal efficiency or to reduce the pumping loss, there are various approaches for accomplishing a lean burn control, a high EGR rate combustion and the like, besides conventional approaches such as raising a compression ratio or an expansion ratio. In making these approaches, miscellaneous gas flow control techniques such as so-called tumble, swirl or squish are essential.

These gas flow controls have been used originally for raising the combustion velocity and forming a homogeneous mixture gas in cylinders but nowadays the flow control is purposely used for forming a locally rich mixture zone or forming a mixture gas in a particular area while the mixture gas remains in a lean condition as a whole. In this case, the combustion strategy is categorized in so-called stratified charge combustion but not in a homogeneous charge combustion.

For example, Japanese Patent Application Laid-open Toku-Kai-Hei No. 5-1544 discloses a technique in which a masking wall provided around the intake valve forcedly generates an inverse tumble flow so as to carry the fuel injected from the fuel injection means provided beneath the intake port on the tumble flow to a spark plug disposed in the center of the cylinder head.

Further, Japanese Patent Application Laid-open Toku-Kai-Hei No. 6-146886 discloses a combustion chamber in which the fuel injection means are disposed beneath the intake port in the same way as in Toku-Kai-Hei No. 5-1544 and the intake port has a sectional configuration with one half side thereof expanded. Due to this configuration with one half side expanded, the main stream of intake air is biased toward the cylinder wall, thereby the generation of the inverse tumble flow is fostered. Further, the combustion chamber according to this prior art is constituted such that a bowl-like piston cavity provided on the top surface of the piston reflects the tumble flow in the direction of the spark plug.

Furthermore, Japanese Patent Application Laid-open Toku-Kai-Hei No. 6-42352 proposes a combustion chamber technique wherein the fuel injection means is disposed in the center of the cylinder head with the injection nozzle directed downward and the spark plug is projected from between two intake ports.

However, the technique disclosed in Toku-Kai-Hei No. 5-1544 has a problem of power shortage at high speeds and high load areas because of the masking wall provided around the intake valve. Further, the combustion chamber disclosed in Toku-Kai-Hei No. 6-146886 has a defect that since the inverse tumble flow is formed only in one half portion of the combustion chamber and only the bowl-like piston cavity forms a combustion space, the compression ratio becomes very high in a limited area of the piston cavity. Further, the combustion chamber technique according to Toku-Kai-Hei No. 6-42352 has a disadvantage in that since the majority of fuel spray reflected on the top surface of the piston is ignited, a good stratified charge combustion is obtained in areas needing small injection amount but can not in areas needing large fuel injection amount. Further, another disadvantage of this prior art is that it is difficult to maintain a stable ignition over the wide range of engine operating conditions because fuel is ignited after being reflected on the top surface of the piston.

SUMMARY OF THE INVENTION

Accordingly, the present invention is intended to obviate the aforementioned disadvantages and problems of the prior arts and it is an object of the present invention to provide a combustion chamber structure of an in-cylinder fuel injection engine capable of securing a stable stratified charge combustion in various engine operating conditions.

In order to achieve the object, the present invention comprises a pentroof-shaped combustion chamber provided on a lower surface of the cylinder head; a fuel injector disposed at the top and in the center of the pentroof-shaped combustion chamber so as to inject a fuel in the downward direction and form a fuel spray; a spark plug disposed in the cylinder head with its electrode situated in proximity of the intake valve; and a piston cavity provided on the top surface of the piston and including a circular protruded portion around the piston cavity and a concave portion inside of the circular protruded portion.

DETAILED DESCRIPTION OF THE INVENTION

Figure 10:
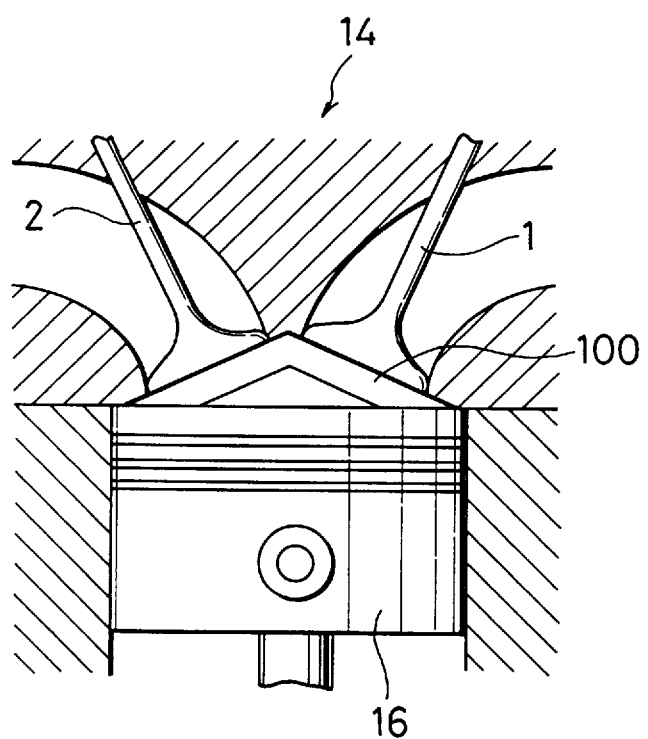
FIG. 10 is a side view of a generic combustion chamber structure having a pentroof.

Describing a generic combustion chamber structure of a pentroof type with reference to FIG. 10, the inner wall of a cylinder head is shaped like a gable roof, i.e., two inclined roof surfaces facing each other. The top surface of a piston 16 is also shaped like a gable roof so as to fit to the gable roof-like configuration of the cylinder head. Further, there are provided with an intake valve 1 and an exhaust valve 2 on each of two inclined surfaces, respectively.

Figure 1:
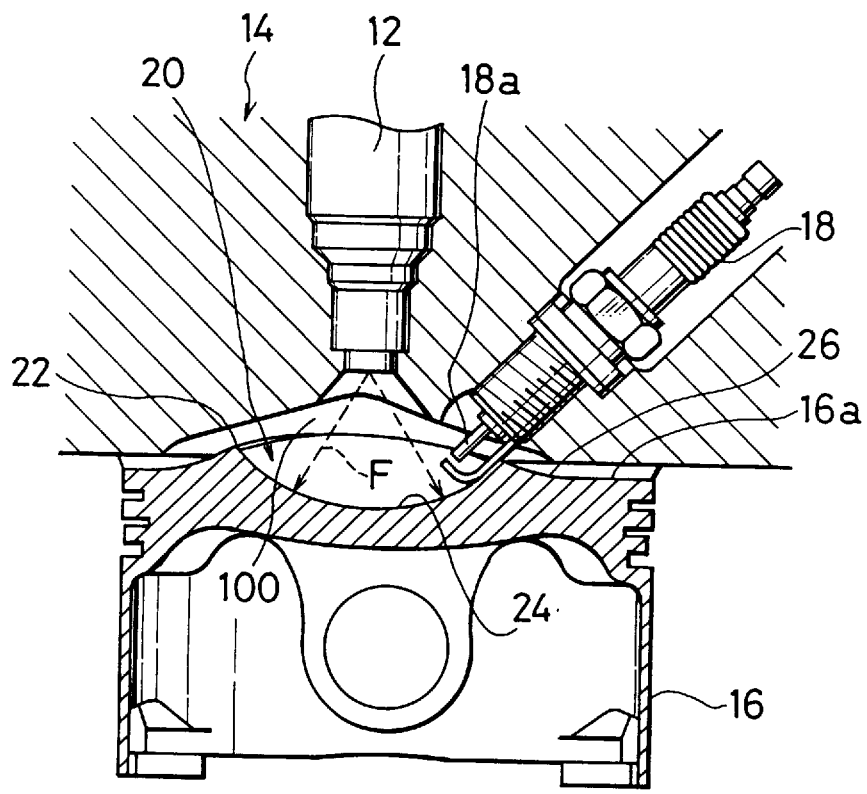
FIG. 1 is a cross-sectional side view of a combustion chamber according to a first embodiment of the present invention.
Figure 2:
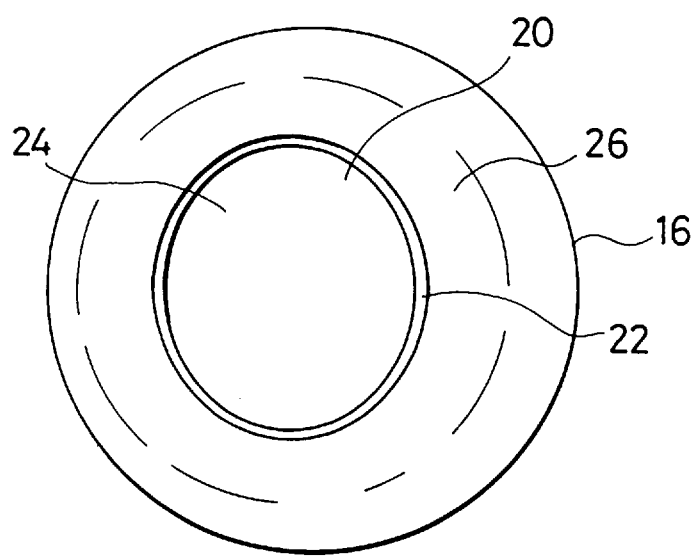
FIG. 2 is a top view of the piston according to a first embodiment of the present invention.

Referring now to FIG. 1 and FIG. 2, the first embodiment is characterized in that combustion chamber structure comprises a combustion chamber 100 formed between a cylinder head 14 and a top surface 16a of the piston 16, a fuel injector 12 provided approximately in the center of the combustion chamber 100 so as to inject fuel in the downward direction, a spark plug 18 disposed in the intermediate position of two intake valves (not shown) and in the position where its electrode 18a is not exposed directly to the fuel injected from the fuel injector 12.

Further, according to the embodiment, the top surface of the piston 16 is shaped into a pentroof so as to fit to the pentroof of the cylinder head 14 and at the same time a piston cavity 20 whose circumference is protruded like a caldera is provided on the top surface of the piston 16. That is, the piston cavity 20 is composed of a circular protruded portion or a ring-shaped protrusion 22 and a concave 24 provided therein.

Further, according to the embodiment, the concave 24 of the piston cavity 20 has a spherical surface whose center of curvature is located at a specified point on the center line of the fuel injector 12. Accordingly, when viewed from the top of the piston, the ring-shaped protrusion 22 has a deformed circle or an approximate oval configuration as shown in FIG. 2. Further, a gentle slope area 26 is formed outside of the ring-shaped protrusion 22 so as to adapt to the pentroof of the cylinder head 14.

Another feature of this embodiment is a hollow cone-shaped fuel spray formed by the fuel injected from the fuel injector 12. That is to say, when fuel is injected from the fuel injector 12, since a rotational velocity component is given to the injected fuel by the nozzle of the fuel injector 12, the fuel spray forms a hollow cone-shape having a thin wall. Specifically, in this embodiment a swirl nozzle is employed. The hollow core-shaped fuel spray (shown by F) has a solid angle of 40 to 80 degrees for example. Further, the bottom circle of the hollow core-shaped fuel spray F is formed so as to stay within the ring-shaped protrusion 22.

Further, according to the embodiment, the intake valve (not shown) is constituted so as to generate a weak tumble flow whose tumble rate is 0.5 to 2 in the normal direction. Further, in this embodiment, the maximum diameter of the ring-shaped protrusion 22 is established to be 30 to 70 percent of the bore and the depth of the piston cavity 20 excluding the protruded portion is established to be approximately 15 percent of the cylinder bore. Further, the electrode 18a of the spark plug 18 is disposed inside of the ring-shaped ridge circle 22 in the position not exposed to the fuel spray directly.

When the hollow cone-shaped fuel spray collides against the bottom of the piston cavity 20 inside of the ring-shaped protrusion 22, the fuel spray is atomized furthermore on the piston cavity 20. Thus atomized fuel is diffused as a fuel mist around through various operations such as reflecting, crawling and jumping. Since the fuel injected vertically downwards and the fuel spray is formed regularly, the diffused fuel spray or fuel mist has an orderly form staying within the piston cavity 20. Further, in conjunction with the rising motion of the piston 16, the diffused fuel spray colliding against the cylinder head, the fuel is further diffused.

On the other hand, since a weak tumble flow is generated in the combustion chamber, the diffused fuel spray flows along the tumble flow and gathers around the electrode 18a of the spark plug 18. Thus, mixture gas having a good ignitability is formed around the spark plug 18.

Figure 9:
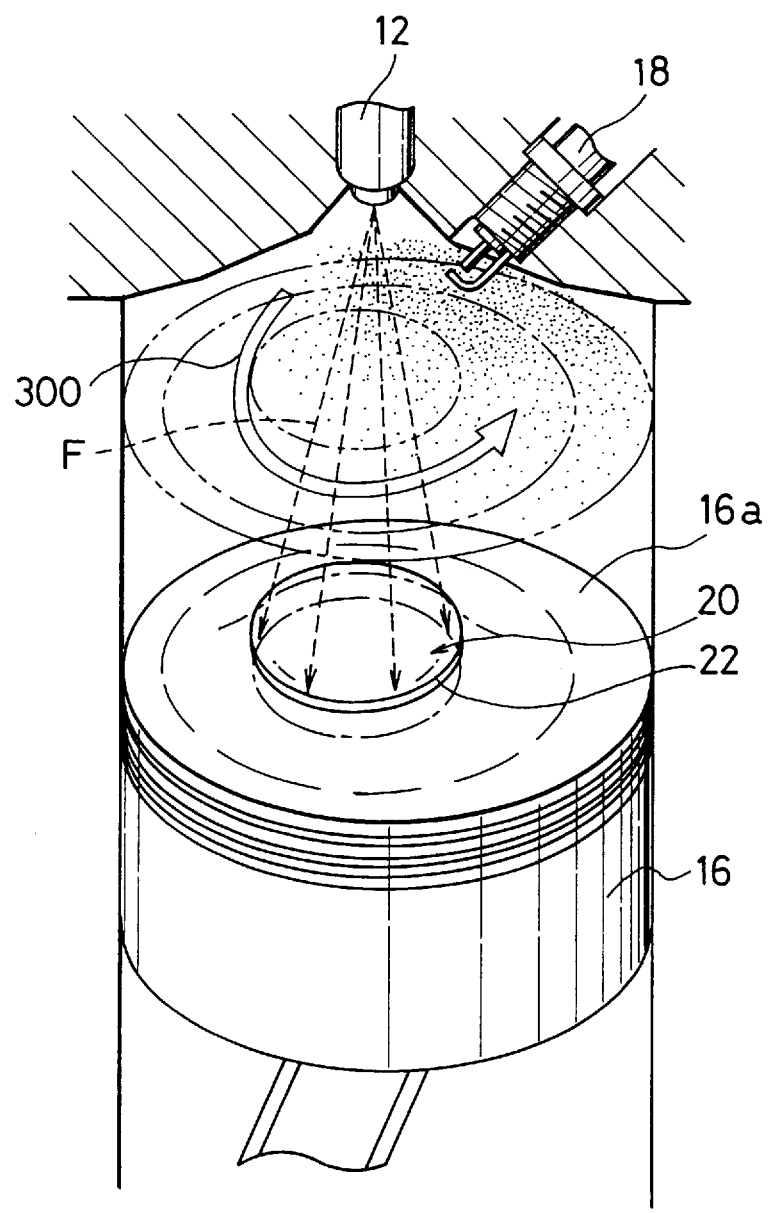
FIG. 9 is an explanatory view showing a formation of fuel spray according to the first embodiment of the present invention.

FIG. 9 is a schematic illustration for showing the aforementioned operation of fuel and intake air. When the piston goes up to a specified position (position shown by a solid line), the hollow cone shaped-fuel spray F is formed by the fuel injector 12. The fuel spray is diffused within the caldera-shaped piston cavity 20 as described above.

Further, when the piston 16 is going up as illustrated by two-dots chain lines in FIG. 9, the diffused fuel spray gathers to the compact combustion space in the piston cavity 20 around the electrode 18a of the spark plug 18 which is disposed between two intake valves, riding on the weak tumble flow shown by an arrow 300.

Since thus obtained state of fuel has a good ignitability and therefore broken pieces of fuel spray and partially over-lean mixture gas, which may hinder flame propagation, can be prevented and further a fast burn can be obtained under the overall lean air-fuel ratio condition. Further, the caldera-shaped piston cavity 20 according to this embodiment prevents the gas flow during compression stroke from being excessively disturbed. Further, on the other hand, this caldera-shaped piston cavity 20 contributes to an improvement of combustion near top dead center due to a moderate disturbance of gas flow. These operations make the stratified charge combustion more efficient and provide a vehicle with an excellent driveability and a reduction of hydrocarbons (HC) and nitrogen oxides (NOx).

Furthermore, since the sprayed fuel hardly diffuses towards the cylinder wall side due to the protruded portion of the piston cavity 20, fuel is prevented from being stuck to the cylinder wall.

Figure 3:
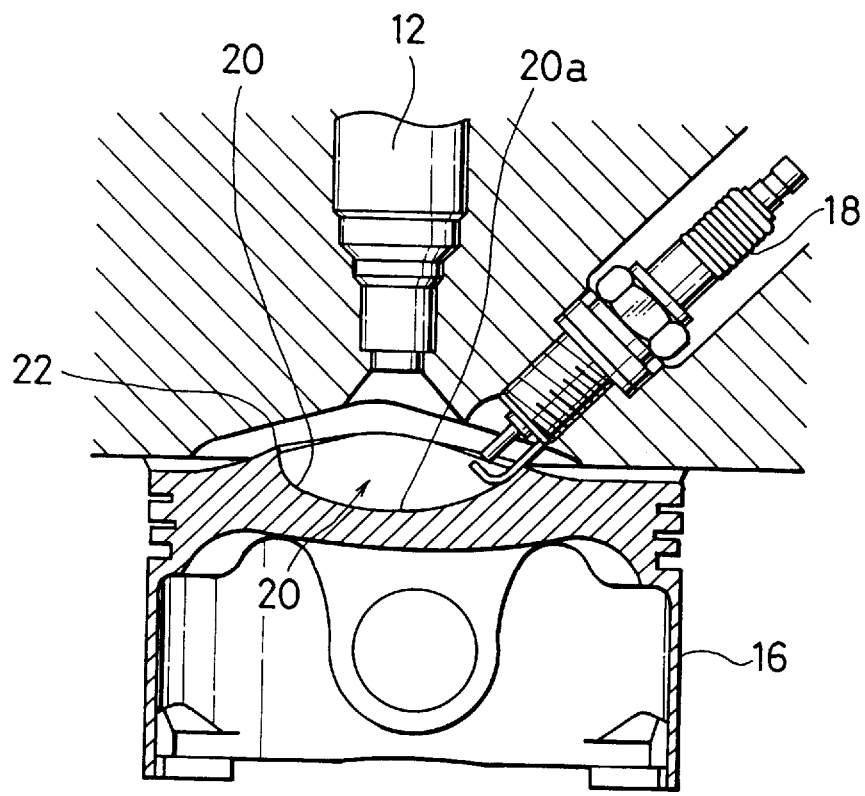
FIG. 3 is a cross-sectional side view of a combustion chamber according to a second embodiment of the present invention.
Figure 4:
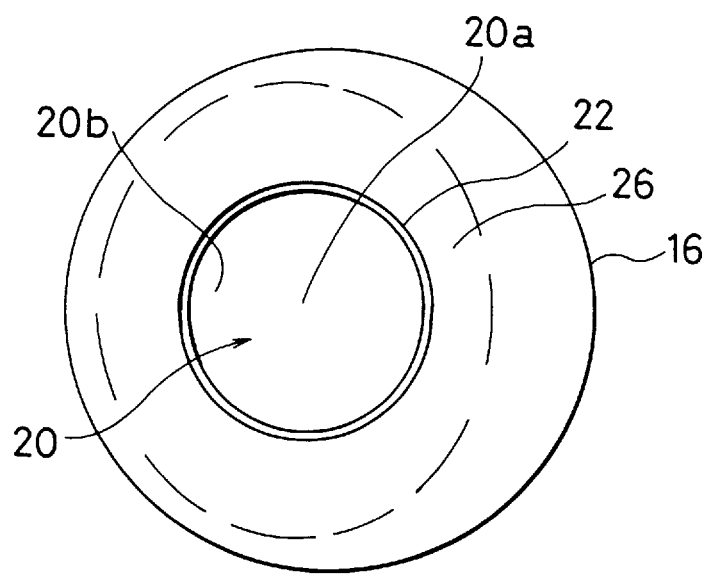
FIG. 4 is a top view of the piston according to a second embodiment of the present invention.

FIG. 3 shows a second embodiment of the combustion chamber and FIG. 4 presents the configuration of the piston according to the second embodiment.

The feature of the combustion chamber according to the second embodiment lies in the configuration of the bottom of the caldera-shaped piston cavity 20. The piston cavity 20 according to the second embodiment is composed of a center bottom area 20a shaped into a spherical surface having a large radius of curvature whose center is located on the center of the fuel injector 12 and an edge rising area 20b which rises from the center bottom area 20a to the ring-shaped ridge circle 22, forming so-called ship bottom-like cross section.

That is to say, the piston cavity 20 according to the embodiment is constituted by a compound spherical surface including two kinds of radiuses of curvature. The edge rising area 20b slopes to the ring-shaped ridge circle 22 at an angle ranging from 90 to 150 degrees and the center bottom area 20a is connected with the edge rising area 20b by a smooth curved surface. Since the piston cavity 20 according to the embodiment has a ship bottom-like concave 24, the top view of the ring-shaped ridge circle 22 becomes more round than that of the first embodiment.

According to the piston cavity 20 thus formed, the hollow cone-shaped fuel spray injected downwards from the fuel injector 12 is caught by the center bottom area 20a having a large radius of curvature and then the fuel is diffused around therefrom by reflecting, crawling and jumping. Further, the diffused fuel collides with the edge rising area 20b and rises at a steep angle. The injection energy is lost there and further diffused upwards along the edge rising area 20b. That is, the direction of the fuel spray is controlled by the edge rising area 20b. As a result, the fuel spray gathers in the vicinity of the electrode 18a of the spark plug 18 in more concentrated form by the operation of the rising piston 16 and the tumble flow in the combustion chamber.

Further, since the slope of the edge rising area 20b has a steep angle, the collision of the stream from the edge rising area 20b with the flow from the gentle slope area 26 is done under the stream directing rather upwards and therefore the diffusion of fuel towards the cylinder wall is more effectively prevented. This provides a good effect on a stratified charge combustion and at the same time prevents fuel from sticking to the cylinder wall more effectively.

Figure 5:
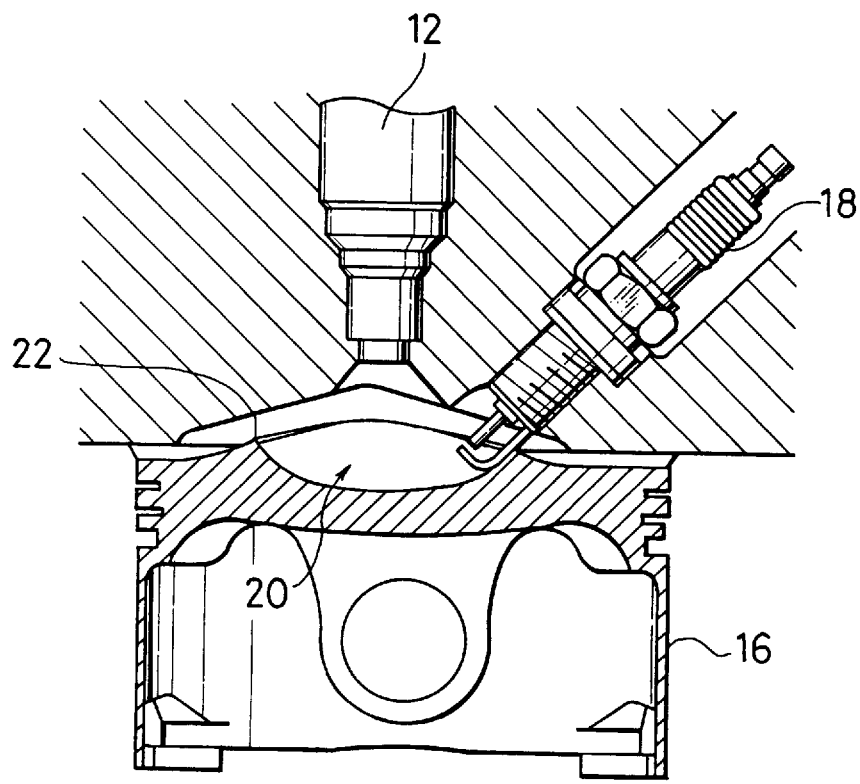
FIG. 5 is a cross-sectional side view of a combustion chamber according to a third embodiment of the present invention.
Figure 6:
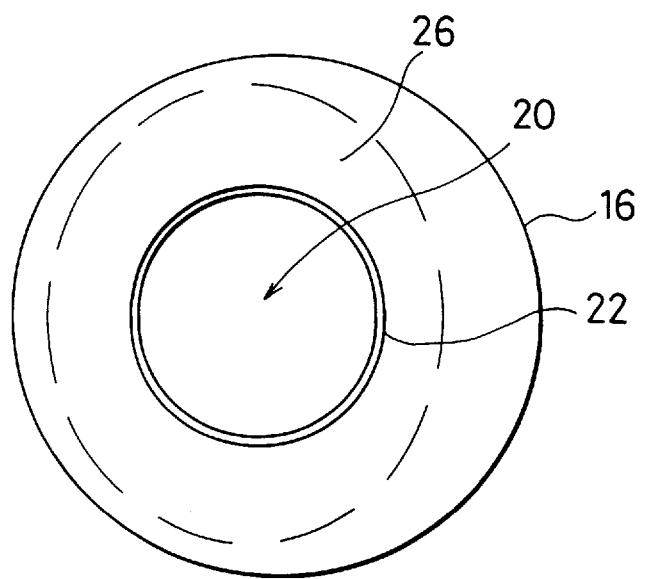
FIG. 6 is a top view of the piston according to a third embodiment of the present invention.

FIG. 5 shows a combustion chamber according to a third embodiment and FIG. 6 illustrates a top view of the piston.

The feature of the construction according to this embodiment is a cross section of the concave 24 of the piston cavity 20 which is shaped into an approximate oval-shaped circular arc configuration. Other construction is almost the same as that of the first and second embodiments.

Since the concave 24 of the piston cavity 20 has a smaller radius of curvature at the edge portion thereof than at the bottom portion thereof, the stream at the edge portion goes upwards in the same manner as the second embodiment, this result in providing a smooth diffusion of fuel and a prevention of fuel from sticking to the cylinder wall.

Figure 7:
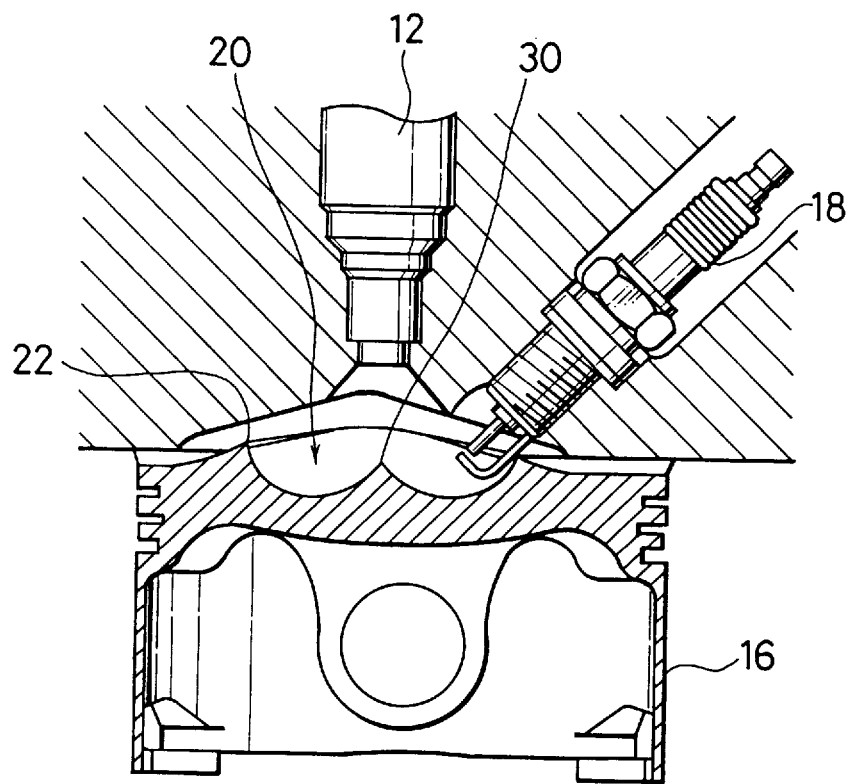
FIG. 7 is a cross-sectional side view of a combustion chamber according to a fourth embodiment of the present invention.
Figure 8:
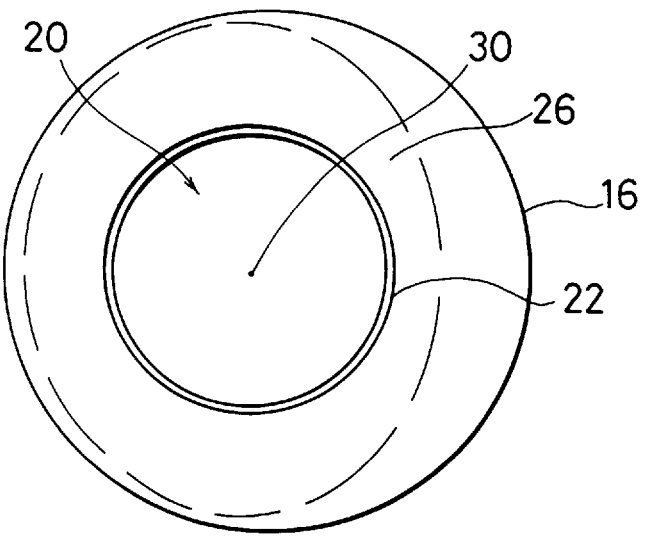
FIG. 8 is a top view of the piston according to a fourth embodiment of the present invention.

Next, FIG. 7 indicates a combustion chamber according to a fourth embodiment and FIG. 8 presents a top surface of the piston.

The feature of the construction according to the present invention lies in a concave 24 shaped into a troidal configuration. That is, a center peak 30 is formed at the center of the concave 24 and a circular arc-shaped cross section is formed between the center peak 30 and the ring-shaped protrusion 22. That is, a ring-like groove is formed around the center peak 30 protruded in the center of the concave 24. In this embodiment, the edge rising area 20b forms a steep slope towards the ring-shaped protrusion 22.

When fuel is injected downwards from the fuel injector 12, the fuel spray is diffused around by the operations such as reflecting, crawling and jumping in the same manner as in the case of the aforementioned embodiments. In case of this embodiment, due to the existence of the center peak 30, the sprayed fuel forms a doughnut-like vortex ring whirling in the center direction of the piston while the fuel flows along the curved surface. Since the doughnut-like vortex ring is well concentrated and the flow direction thereof is controlled, the diffusion towards the cylinder wall can be prevented effectively. Further, since the doughnut-like vortex ring enfolds the surrounding air well, an ignitable mixture is readily formed around the electrode 18a of the spark plug 18.

Further, according to the embodiment, since the sprayed fuel has a wide range of contact with the curved surface, the controllability of the flow of the fuel spray can be raised higher than any other embodiments.

In the aforementioned embodiments, the gas flow indicates a tumble flow but it is not limited to the tumble flow. A swirl flow can be applied to the combustion chamber, too.

In this case, similarly to the tumble flow, the sprayed fuel is diffused in the caldera-shaped piston cavity 20 by the operations, reflecting, crawling and jumping. Further, for any types of the combustion chamber of the embodiments, since the top surface of the piston is shaped into a gentle curved surface, the swirl flow is retained in the combustion chamber without being disturbed. Further, this swirl flow can restrict a diffusion of the sprayed fuel towards the cylinder wall.

Further, in the swirl flow an ignitable mixture is formed around the electrode 18a of the spark plug 18 while the overall mixture gas is still lean.

In summary, according to the present invention, the combustion chamber structure including a piston cavity is suitable for forming an ignitable mixture gas around the spark plug while the overall air-fuel ratio is retained to be lean. That is, the present invention provides a combustion chamber structure most suitable for the stratified charge combustion.

While the presently preferred embodiments of the present invention have been shown and described, it is to be understood that these disclosures are for the purpose of illustration and that various changes and modifications may be made without departing from the scope of the invention as set forth in the appended claim.

What is claimed is:

1. An internal combustion engine having a cylinder, a piston movably disposed in said cylinder for reciprocal motion, a cylinder head, an intake valve disposed in said cylinder head for introducing an air and an exhaust valve disposed in said cylinder head for exiting burned gases, comprising:

a pentroof-shaped combustion chamber provided on a lower surface of said cylinder head;

a fuel injector disposed at the top and in the center of said pentroof-shaped combustion chamber so as to inject a fuel in the downward direction and form a fuel spray;

a spark plug disposed in said cylinder head with its electrode situated in proximity of said intake valve; and a piston cavity provided on the top surface of said piston and including a circular protruded portion around said piston cavity and a concave portion inside of said circular protruded portion.

2. The internal combustion engine according to claim 1, wherein said fuel is sprayed toward said piston cavity in a shape of a hollow cone with a thin wall.

3. The internal combustion engine according to claim 2, wherein said hollow cone stays within said circular protruded portion.

4. The internal combustion engine according to claim 1, wherein said concave portion comprises a spherical surface whose center of curvature is located at a specified position on the center axis of said fuel injector.

5. The internal combustion engine according to claim 1, wherein said concave portion comprises a center bottom area having a comparatively large radius of curvature whose center is located at a comparatively high position on the center axis of said fuel injector and an edge rising area rising towards said circular protruded portion at a relatively steep angle.

6. The internal combustion engine according to claim 5, wherein said center bottom area is smoothly connected with said edge rising area.

7. The internal combustion engine according to claim 1, wherein said concave portion is shaped into an oval-shaped circular arc cross section.

8. The internal combustion engine according to claim 1, wherein said concave portion comprises a center peak portion provided at the center of said circular protruded portion and a circular groove provided around said center peak portion and having a circular ark-shaped cross section between said circular protruded portion and said center peak portion.

9. The internal combustion engine according to claim 8, wherein
said center peak portion is smoothly connected at the foot thereof with said circular groove.

* * * * *